United States Patent [19]

Wood

[11] 4,322,265
[45] Mar. 30, 1982

[54] ATMOSPHERIC GLYCOL RECLAIMER WITH VAPOR RECYCLE

[75] Inventor: Harold S. Wood, Tulsa, Okla.

[73] Assignee: Maloney-Crawford Corporation, Tulsa, Okla.

[21] Appl. No.: 156,164

[22] Filed: Jun. 3, 1980

[51] Int. Cl.³ .............................................. B01D 1/14
[52] U.S. Cl. .................................... 159/47 R; 159/44; 159/16 S; 159/24 A; 203/18; 203/26
[58] Field of Search .................... 159/16 R, 16 S, 47, 159/31, 24 A, 44; 203/18, 19, 26; 62/17, 20

[56] References Cited

U.S. PATENT DOCUMENTS

| | | | |
|---|---|---|---|
| 1,461,640 | 7/1923 | Wirth-Frey | 202/173 |
| 2,177,068 | 10/1939 | Hutchinson | 23/2 |
| 2,342,419 | 2/1944 | Martin | 203/18 |
| 3,103,470 | 9/1963 | Wilson et al. | 203/18 |
| 3,370,636 | 2/1968 | Francis, Jr. et al. | 159/16 R |
| 3,397,731 | 8/1968 | Gravis et al. | 159/16 R |
| 3,450,603 | 6/1969 | Meyers et al. | 203/18 |
| 3,589,984 | 6/1971 | Reid | 202/173 |
| 3,824,177 | 7/1974 | Honerkamp et al. | 203/18 |
| 3,855,337 | 12/1974 | Foral, Jr. et al. | 260/674 |
| 3,867,112 | 2/1975 | Honnerkamp et al. | 55/32 |

Primary Examiner—Norman Yudkoff
Attorney, Agent, or Firm—Head & Johnson

[57] ABSTRACT

Method and apparatus for purifying or reclaiming liquid desiccant comprising heating a water rich desiccant to form dilute desiccant vapor; partially condensing said vapor to produce a purified desiccant equal in strength to the feed stream, reintroducing a first stream of said vapor by sparging into the means of heating said desiccant and cooling a second stream of said vapor thereby refluxing condensible desiccant and venting non-condensible gases, and recovering condensed vapor for use elsewhere.

21 Claims, 1 Drawing Figure

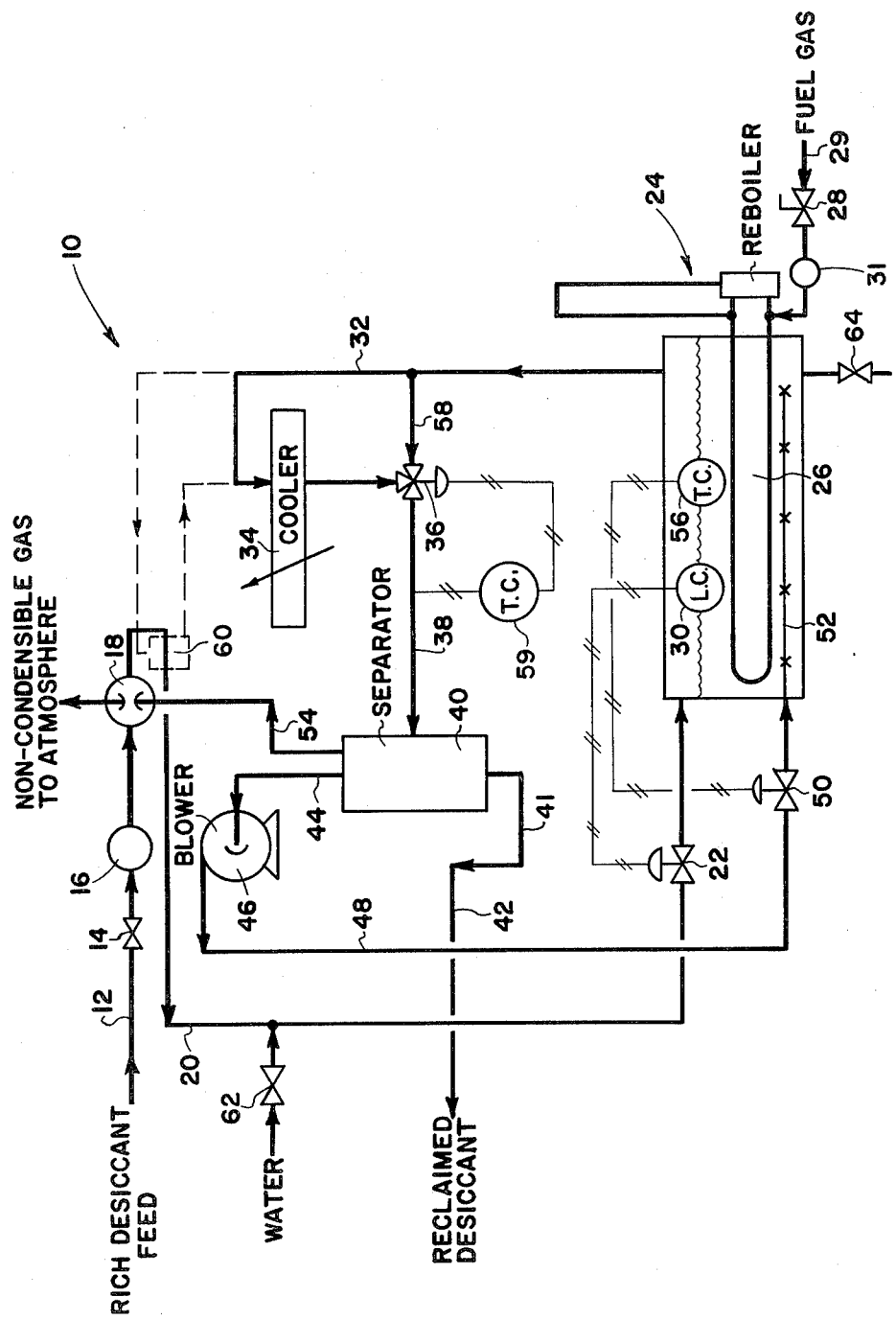

ATMOSPHERIC GLYCOL RECLAIMER WITH VAPOR RECYCLE

BACKGROUND OF THE INVENTION

1. Field of the Invention

The present invention relates to a method of reclaiming a contaminated liquid desiccant, such as glycol, and more particularly, to such a method which recycles a portion of uncondensed vapor to a reboiler through submerged sparge connections.

2. Description of Prior Art

Liquid desiccants, such as diethylene and triethylene glycol, are commonly used for the dehydration of natural gas streams. The dehydration occurs by the mixing of the liquid desiccant with the gas stream and the removal of water therefrom because of the greater affinity of water for glycol than for the natural gas. The moisture-laden glycol is then collected and is heated above the boiling point of the water in order to drive off the water from the glycol. The dehydrated or lean glycol is then recycled into contact with the natural gas stream.

The regeneration or reconcentration of the desiccant by reheating is usually sufficient to remove the water from the desiccant; however, numerous regeneration systems have been designed to more fully reconcentrate the desiccant.

In normal operation of a natural gas dehydration unit with triethylene glycol (TEG) or other high boiling liquid desiccants, thermal decomposition products accumulate in the circulating solution in the form of both solid particles and other higher boiling liquid products. In addition to the accumulation of thermal decomposition products there may be a significant accumulation of dissolved mineral salts originating from entrained water which is often present in the gas feeding the glycol contactor. To prevent premature discard of these solutions various reclaimers have been employed to recover active glycol from the generally non-volatile impurities by means of vacuum distillation. As an example, vacuum conditions have been required to limit the kettle temperatures to an approximate maximum of 400° F. with TEG for the purpose of minimizing decomposition during distillation.

SUMMARY OF THE INVENTION

The present invention relates to an improved apparatus for reclaiming or purifying a liquid desiccant and, more particularly, to such an apparatus which recycles and sparges a stream of desiccant vapor into the reboiler.

One object of this invention is method and apparatus to distill an aqueous desiccant, such as glycol, under atmospheric conditions and thus eliminate the complications of vaccum distillation found in the prior art.

The method of reclaiming or purifying a liquid desiccant is comprised of heating an aqueous desiccant solution within a reboiler to produce a desiccant vapor. The desiccant vapor is partially condensed within a cooler-condenser and a first and second stream of non-condensed vapor is separated from within a separator following the cooler-condenser. The first stream of vapor is recycled into the reboiler by sparger pipes submerged in the desiccant within the reboiler. The second stream of vapor is cooled and thereby refluxes condensible desiccant back to the separator while venting non-condensible gases or gases inert to this system. The recovered condensed desiccant is removed from the separator for use elsewhere.

All or a portion of the vapor may be cooled after exiting the reboiler and before introduction into the separator in order to maintain a desired temperature in the separator. The recycle vapor rate is regulated to maintain the boiling desiccant within the reboiler at another desired temperature. (In the case of TEG as the liquid desiccant the reboiler temperature should not exceed 400° F.)

Automatic control is provided for the cooler-condenser outlet temperature. Automatic controls are also provided within the reboiler to maintain the desiccant level and temperature therein.

BRIEF DESCRIPTION OF THE DRAWING

The drawing is a diagrammatic illustration of a liquid desiccant reclaimer apparatus embodying the present invention.

DETAILED DESCRIPTION OF THE PREFERRED EMBODIMENTS

Referring to the drawing in detail, reference character 10 generally indicates an apparatus for reclaiming a desiccant with a vapor recycle. As shown in the FIGURE, water-rich desiccant, such as ethylene glycol, diethylene glycol (DEG), triethylene glycol (TEG) or the like, from an operating glycol absorber (not shown) at approximately 100° F. and 95 by weight % (wt. %) concentration, is introduced to the apparatus 10 through a conduit 12, a block valve 14, a flow meter 16 to a vent gas cooler 18. The operation of the vent gas cooler 18 will be described in more detail hereinbelow. The water-rich glycol flows from the cooler 18 through a conduit 20, a diaphragm level control valve 22 and is then discharged into the upper portion of vapor zone of a reclaimer-reboiler 24. The glycol is heated within the reboiler 24 by means of an immersed firetube 26, which is fueled by a supply of a gas through a globe valve 28 and a gas line 29. The level of the glycol within the reboiler 24 is maintained by means of a level control means 30 within the reboiler 24, which is in communication with the level control valve 22. A fuel gas meter 31 is located in the gas line 29 downstream from the globe valve 28. The gas meter 31 indicates the fuel gas rate for comparison with the liquid flow rate from the meter 16. As the liquid flow rate declines relative to the fuel gas rate, this furnishes an indication of the extent of firetube fouling and is a guide as to when the firetube 26 should be cleaned.

When the glycol is heated above the boiling point of water and below the degradation temperature of the glycol, a vapor is formed of primarily glycol and water. This vapor mixture passes through a conduit 32 from the reboiler 24 to an air-fin cooler 34 which partially condenses the glycol vapor mixture to the feed concentration of approximately 95 wt. % TEG as liquid product and a dilute glycol vapor mixture at a temperature range of approximately 250° to 300° F. and nearly atmospheric pressure. The two-phase glycol mixture passes from the air-fin cooler 34 through a 3-way control valve 36, a conduit 38, to a condensate separator 40, where the condensed liquid glycol is separated from the vapor. The now purified or reclaimed glycol product flows from the separator 40 through a liquid trap 41 within the conduit 42 and out of the reclaimer system for use elsewhere.

A stream of the glycol vapor mixture within the separator 40 is withdrawn through a conduit 44 by means of a blower 46 and is forced through a conduit 48 and an automatc control valve 50 to one or more sparge pipes 52, which are submerged in the glycol within the lower portion of the reboiler 24. The sparge pipes 52 disperse the glycol vapor mixture into the liquid as finely divided bubbles.

The apparatus 10 is maintained at nearly atmospheric pressure by means of an equalizing vapor line 54 which passes a small vapor stream from the condensate separator 40 through the vent gas cooler 18, which cools the vapor by heat exchange with the glycol feed from the glycol absorber and which refluxes condensible components back to the separator 40, while purging non-condensible gases to the atmosphere. This step is required in essentially all glycol dehydration systems because of the small concentration of non-condensible gas which is present in rich glycol streams which have been equilibrium contact with gas streams at higher pressures and lower temperatures than exist in the separator 40.

It should be noted that the boiling glycol in the reboiler 24 at the maximum operating temperature 400° F. and at atmospheric pressure is within the general range of 98.0 to 99.5 wt.% TEG. The equilibrium vapor from the reboiler 24 may range from approximately 50 to 74 wt. % TEG and when this vapor is cooled to the above-stated range of 250° to 300° F., a portion of this vapor condenses to the feed concentration of 95 wt. % TEG, leaving an uncondensed recycle vapor concentration of approximately 8 to 16 wt. % TEG. When this lean glycol vapor mixture is recycled to the reboiler 24, this vapor is mixed with the reboiler liquid and emerges as a reconcentrated vapor of the same 50 to 74 wt. % TEG concentration as the reboiler vapor at a maximum temperature of 400° F. When the system is in equilibrium, approximately 1.0 to 1.3 pounds of recycled vapor are circulated per pound of 95% TEG.

The temperature of the glycol within the reboiler 24 should not exceed 400° F. and is primarily controlled by means of a temperature control 56, which is mounted in the reboiler 24 and which is in communication with the 2-way control valve 50. The temperature control 56 maintains the temperature of the boiling glycol by means of regulating the recycle vapor rate to the reboiler 24. Also, a portion of the reboiler vapor may pass through a conduit 58 directly to the 3-way control valve 36. A temperature control 59 is mounted in conduit 38 to regulate the amount of reboiler vapor by-passing the cooler 34, thereby controlling the temperature of fluids entering the separator 40.

It should be pointed out that the previously explained small inert gas concentration in the feed glycol stream can build up to a substantial inert gas concentration in the recycle vapor stream, even though it is being continuously purged from the system 10 through the vent gas cooler 18. The lower the effluent stream temperature from the air-fin cooler 34, the higher concentration build up of inert gas in the recycle vapor stream. Also, the higher the recycle vapor rate, the lower the reboiler temperature.

The following calculated table is offered to illustrate the general effects from variations in the recycle vapor rates and cooler effluent temperatures for a small reclaimer unit processing 95 wt. % TEG at a constant reboiler heat duty of 51.2 MBtu/hr:

| | OPERATING VARIABLES | EXAMPLE NUMBER | | | | | |
|---|---|---|---|---|---|---|---|
| | | I | II | III | IV | V | VI |
| 1 | Condenser Outlet Temp., °F. | 305 | 305 | 290 | 290 | 245 | 245 |
| 2 | Reboiler Temp., °F. | 400 | 360 | 400 | 360 | 400 | 360 |
| 3 | Inert Gas Concentration, mm Hg* (Non-condensibles) | 0 | 0 | 160 | 160 | 460 | 460 |
| 4 | Feed TEG Rate, lbs/hr. | 100.0 | 88.0 | 98.1 | 85.2 | 100.2 | 89.3 |
| 5 | Recycle Vapor Rate, ACFM | 54.2 | 154.5 | 59.6 | 146.3 | 48.7 | 84.3 |
| 6 | Condenser Duty, MBtu/hr. | 38.6 | 40.1 | 39.1 | 40.8 | 41.8 | 42.8 |
| 7 | Reboiler Liquid Concentration, wt. % TEG | 98.4 | 97.5 | 98.8 | 98.0 | 99.4 | 98.9 |

*Partial pressure in reboiler vapor
NOTE:
These calculations are based upon TEG equilibrium data published in Gas Conditioning Fact Book, Dow Chemical Co., 1962 Edition Optional features for the apparatus 10 include use of a water-cooled or glycol tubular heat exchanger (not shown) for the air-fin cooler 34 and the use of an economizing heat exchanger 60 to preheat the rich feed glycol with the reboiler vapor prior to passing it through the air-fin cooler 34. The advantage of the heat exchanger 60 is to reduce reboiler heat duty and cooler duty by the available duty of the heat exchanger 60. In smaller units the heat exchanger 60 is probably not normally economical to use.

As non-volatile impurities accumulate in the reboiler 24, the capacity and efficiency of the apparatus 10 is progressively reduced. The apparatus 10 is best restored to fully operating capacity and efficiency by using a clean-up procedure which consists of discontinuing the rich glycol feed by shutting off the block valve 14 and introducing water through a block valve 62 into the conduit 20 at a rate set by the level control means 30. This operation essentially permits total condensation of the glycol-steam vapor from the reboiler 24 so as to enable the recycle vapor blower 46 to be shut down. At the time the blower is shut down temperature control 59 should be reset to 210° F. or less for the purpose of closing 3-way control valve 36, which will then permit the required complete condensation of reboiler vapor. The glycol is recovered from the reboiler as a progressively dilute condensate. When the temperature of the reboiler 24 is finally stabilized at approximately 212° F., the boiling point of water, it can be assumed that essentially all of the volatile glycol is recovered and the remaining contents of the reboiler 24 can then be dumped as waste through a block valve 64, which is mounted in the lower portion of the reboiler 24. After suitable flushing and cleaning of any solid residue from the reboiler 24, the apparatus 10 may then be prepared for a new reclaiming cycle. The firetube 26 is preferably of removable design so that it can be disassembled, if necessary, for mechanical cleaning.

Whereas the present invention has been described in particular relation to the drawing attached hereto, it should be understood that other and further modifications of the invention, apart from those shown or suggested herein, may be made within the scope and spirit of this invention.

What is claimed is:

1. In a method of reclaiming a liquid desiccant comprising:
heating a water rich desiccant within a reboiler to its atmospheric boiling temperature, which is a temperature above the boiling point of water and below the temperature of degradation of said desiccant, to produce vapor essentially of desiccant and water, the improvement being:
(a) partially condensing said vapor within a condenser;
(b) recovering condensed desiccant from uncondensed vapor within a separator;
(c) dividing uncondensed vapor from said separator into first and second streams;
(d) recycling said first stream of vapor into intimate contact with said desiccant within said reboiler;
(e) cooling said second stream of vapor and refluxing condensed desiccant to said separator while venting non-condensible gases; and
(f) recovering all condensed desiccant from said separator without returning to reboiler for use elsewhere.

2. In the method as set forth in claim 1 wherein said desiccant is glycol.

3. In the method as set forth in claim 1 wherein said desiccant is diethylene glycol (DEG).

4. In the method as set forth in claim 1 wherein said desiccant is triethylene glycol (TEG).

5. In the method as set forth in claim 1, the further improvement wherein all or a portion of said vapor is cooled after being heated within said reboiler and before introduction into said separator.

6. In the method as set forth in claim 5 the further improvement in cooling said vapor in order to control the feed stream temperature to said separator.

7. In the method as set forth in claim 6 the further improvement in recycling said vapor at a controlled rate to regulate said reboiler operating temperature.

8. In a method as set forth in claim 1 wherein said water-rich desiccant, before introduction into said reboiler, is preheated within a heat exchanger with said stream of vapor diverted after exiting said reboiler and before introduction into said condenser.

9. In the method of claim 1 the further improvement in recycling said first stream of vapor within said reboiler by sparging.

10. In the method of claim 1 the further improvement wherein the cooling of said second stream of vapor occurs by heat exchange with said water-rich desiccant.

11. In an apparatus for reclaiming a liquid desiccant comprising in combination:
(a) a reboiler means wherein water-rich desiccant is heated to its atmospheric boiling temperature, which is a temperature above the boiling point of water and below the temperature of degradation of said desiccant to produce vapor essentially of desiccant and water;
(b) a condenser means werein said vapor from said reboiler is partially condensed;
(c) a separator means wherein uncondensed vapor from said condenser is separated from condensed desiccant;
(d) means within said separator to divide uncondensed vapor into first and second streams;
(e) means to recycle said first stream of vapor into intimate contact with said desiccant within said reboiler;
(f) vent gas cooling means in communiction with said separator means wherein said second stream of vapor is cooled and the resulting reflux of condensible desiccant drains back to said separator means while venting non-condensible gases; and
(g) means to recover all condensed vapor from said separator means for use elsewhere without returning to reboiler.

12. In an apparatus as in claim 11 wherein said desiccant is glycol.

13. In an apparatus as in claim 11 wherein said desiccant is diethylene glycol (DEG).

14. In an apparatus as in claim 11 wherein said desiccant is triethylene glycol (TEG).

15. In an apparatus as in claim 11 wherein said condenser means cools all or a portion of said vapor after exiting said reboiler means and before introduction into said separator means.

16. In an apparatus as in claim 15 including a temperature control means in a feed line to said separator, which is in communication with a by-pass valve means to divert or partially divert said vapor after exiting said reboiler and before said condenser means.

17. In an apparatus as in claim 11 including a second temperature control means to maintain said desiccant within said reboiler at an operating temperature not to exceed 400° F. (for TEG) at atmospheric pressure.

18. In an apparatus as in claim 11 including means to preheat said water-rich desiccant before introduction into said reboiler means.

19. In an apparatus as in claim 18 wherein said preheating means is a heat exchanger heated by said stream of said vapor exiting said reboiler before introduction of said vapor into said condenser means.

20. In an apparatus as in claim 11 wherein said means to recycle said first stream of vapor includes at least one sparge pipe submerged within said desiccant within said reboiler means and a blower means in communication with said sparge pipe to force said vapor therethrough.

21. In an apparatus as in claim 11 including level control means within said reboiler means and in communication with a feed control valve means to maintain said desiccant within said reboiler means at a substantially constant level.

* * * * *